(12) United States Patent
Gottwald et al.

(10) Patent No.: US 12,009,679 B2
(45) Date of Patent: Jun. 11, 2024

(54) METHOD FOR OPERATING AN ELECTRICAL ENERGY STORE

(71) Applicant: Robert Bosch GmbH, Stuttgart (DE)

(72) Inventors: Frank Gottwald, Weissach (DE); Rainer Heinrich Hoerlein, Lake Orion, MI (US); Thomas Dufaux, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 369 days.

(21) Appl. No.: 17/296,740

(22) PCT Filed: Nov. 20, 2019

(86) PCT No.: PCT/EP2019/081930
§ 371 (c)(1),
(2) Date: May 25, 2021

(87) PCT Pub. No.: WO2020/109105
PCT Pub. Date: Jun. 4, 2020

(65) Prior Publication Data
US 2021/0399569 A1     Dec. 23, 2021

(30) Foreign Application Priority Data
Nov. 26, 2018  (DE) ...................... 10 2018 220 212.5

(51) Int. Cl.
*H02J 7/00* (2006.01)
*B60L 3/00* (2019.01)
(Continued)

(52) U.S. Cl.
CPC ........ *H02J 7/00304* (2020.01); *B60L 3/0046* (2013.01); *B60L 3/04* (2013.01); *B60L 3/12* (2013.01); *H02J 7/0047* (2013.01)

(58) Field of Classification Search
CPC ... H02J 7/00304; H02J 7/0047; B60L 3/0046; B60L 3/04; B60L 3/12
See application file for complete search history.

(56) References Cited

U.S. PATENT DOCUMENTS 8,872,480 B2 * 10/2014 DeBoer ..................... H02J 7/02
 320/136
10,431,973 B2 * 10/2019 Morimoto .............. H02H 3/087
(Continued)

FOREIGN PATENT DOCUMENTS

| CN | 1712268 A | 12/2005 |
|---|---|---|
| CN | 102170117 A | 8/2011 |

(Continued)

OTHER PUBLICATIONS

Translation of International Search Report for Application No. PCT/EP2019/081930 dated Feb. 5, 2020 (2 pages).

*Primary Examiner* — Richard V Muralidar
(74) *Attorney, Agent, or Firm* — Michael Best & Friedrich LLP

(57) ABSTRACT

The invention relates to a method for operating an electrical energy store, comprising a storage cell for storing electrical energy and a control unit, wherein a safety switch is provided which is designed to interrupt an electrical line of the electrical energy store, wherein a current flowing through the electrical line is detected and an actuation of the safety switch only occurs if the current is below a predefinable threshold value.

7 Claims, 2 Drawing Sheets

(51) Int. Cl.
*B60L 3/04* (2006.01)
*B60L 3/12* (2006.01)

(56) References Cited

U.S. PATENT DOCUMENTS

| | | |
|---|---|---|
| 2013/0140890 A1 | 6/2013 | Nisonen |
| 2015/0175002 A1 | 6/2015 | Lee |
| 2018/0019590 A1* | 1/2018 | Morimoto .............. H02H 9/025 |

FOREIGN PATENT DOCUMENTS

| | | |
|---|---|---|
| CN | 105514944 A | 4/2016 |
| DE | 102016218599 A1 | 3/2018 |
| DE | 202017103672 U1 | 9/2018 |
| EP | 2602894 A1 | 6/2013 |
| WO | 2014087213 A1 | 6/2014 |

* cited by examiner

METHOD FOR OPERATING AN ELECTRICAL ENERGY STORE

BACKGROUND OF THE INVENTION

Electrical energy stores, such as are used, for example, for the operation of an electric vehicle, are usually protected by means of safety switches, that is to say provision is made of a switch which is able to set a current-carrying line within the energy store to an off state, for example when a tripping signal is applied to the safety switch. The tripping signal can be formed, for example, when a fault in the electrical energy store (for example a fault at the energy store itself or faulty current sensor) is identified or else when an accident of the vehicle in which the electrical energy store is possibly installed is identified or as a reaction to an excessively high power demand of the vehicle.

The safety switch is usually dimensioned in this case in such a way that activation of the safety switch is reliably possible even when a short-circuit current output by the electrical energy store flows through the safety switch. Since the safety switch is therefore designed for high currents, the safety switch is a costly and large component. The safety switch is usually designed for a maximum current below the short-circuit current, wherein tripping of the safety switch in the case of a current above the maximum current leads to the electrical energy store subsequently having to be considered to be faulty. Tripping of the safety switch in the case of a current above the maximum current is therefore possible only once. Activations in the case of currents below the maximum current are reversible.

SUMMARY OF THE INVENTION

The method for operating an electrical energy store, which comprises a storage cell for storing electrical energy and a control unit, wherein a safety switch configured to interrupt an electrical line of the electrical energy store is provided, in contrast has the advantage that a current flowing through the electrical line is detected and the safety switch is activated only when the current is below a predefinable threshold value. It can therefore be ensured that the safety switch cannot be switched at any arbitrary value of the current output by the electrical energy store. The safety switch can be designed accordingly to be smaller and more cost-effective with respect to its ability to switch at high currents.

Advantageous embodiments are the subject matter of the dependent claims.

It is advantageous that the threshold value corresponds to a maximum current of the safety switch. Maximum current is to be understood here as the current that may flow through the safety switch at a maximum, due to component aspects, at the time of activation of the safety switch without the electrical storage cell subsequently having to be considered as faulty.

It is advantageous that an activation signal that is intended to bring about the activation of the safety switch is suppressed until the current falls below the predefinable threshold value. Activation of the safety switch in as timely a manner as possible can thus be ensured after formation of the activation signal and temporary drawing of electrical energy by a current above the threshold value is possible.

It is advantageous that an exceedance time in which the current is above the predefinable threshold value is not longer than a predefinable tolerance time.

It is advantageous that the exceedance time is estimated as soon as the current exceeds the predefinable threshold value and the safety switch is activated when the estimated exceedance time exceeds the tolerance time. In a particularly advantageous embodiment, the exceedance time is estimated in this case based on operating parameters of a vehicle in which the electrical energy store is installed. This estimation can be carried out, for example, on the basis of events recorded in the past or else by using a trained neural network. As an alternative, the exceedance time can be assumed at 0.5 to 5 seconds, in particular 1 to 2 seconds. The tolerance time is in this case selected, in particular, in such a way that it is ensured that the electrical energy store is in a safe state within the tolerance time.

It is advantageous that the exceedance time is estimated as soon as the current exceeds a pre-threshold value, which is smaller than the predefinable threshold value, and the safety switch is activated when the estimated exceedance time exceeds the tolerance time. It is therefore advantageously possible to ensure that a safety switch which is dimensioned in such a way that it cannot be tripped at any possible current output by the electrical energy store without the electrical energy store subsequently having to be considered as faulty does not have to be tripped as long as the current is above the predefinable threshold value. For this purpose, the estimation of the exceedance period of the threshold value is started at the time at which a pre-threshold value is exceeded. If it is estimated here that the predicted exceedance time exceeds the tolerance time, the safety switch is activated for reasons of safety as soon as the current reaches the predefinable threshold value.

A device, which is configured to carry out each step of the method according to the invention, and an electrical energy store, which comprises the device, are advantageous. A computer program, which is configured to carry out each step of the method according to the invention when the computer program is run on a computation unit is also advantageous.

An exemplary embodiment of the invention is presented in more detail below. In this case:

DETAILED DESCRIPTION

Figure 1:
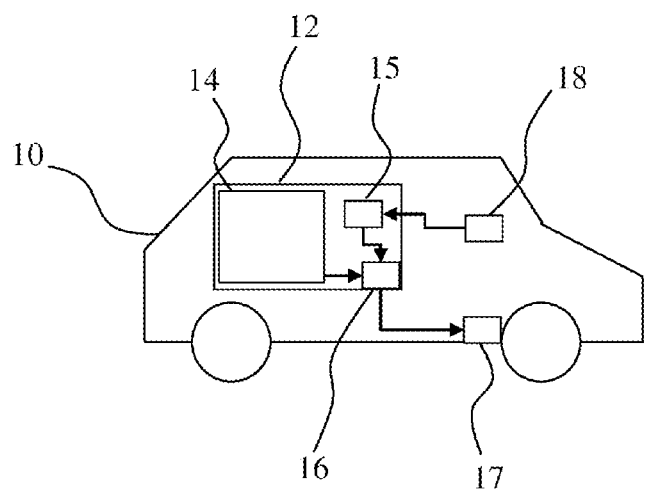
FIG. 1 shows a schematic illustration of an electric vehicle with an electrical energy store.

FIG. 1 shows a schematic illustration of an electric vehicle (10), which comprises an electrical energy store (12), a vehicle control unit (18) and a drive motor (17). The electrical energy store (12) in turn comprises a storage cell (14) and a control unit (15). A safety switch (16) is arranged at the electrical energy store (12) in such a way that the safety switch (16) can interrupt an electrical line of the electrical energy store (12) via which electrical line, for example, the drive motor (17) is supplied with electrical energy. The control unit (15) of the electrical energy store (12) is connected to the safety switch (16) via a signal line. The vehicle control unit (18) is connected to the control unit (15) of the electrical energy store (12) via a signal line.

Figure 2:
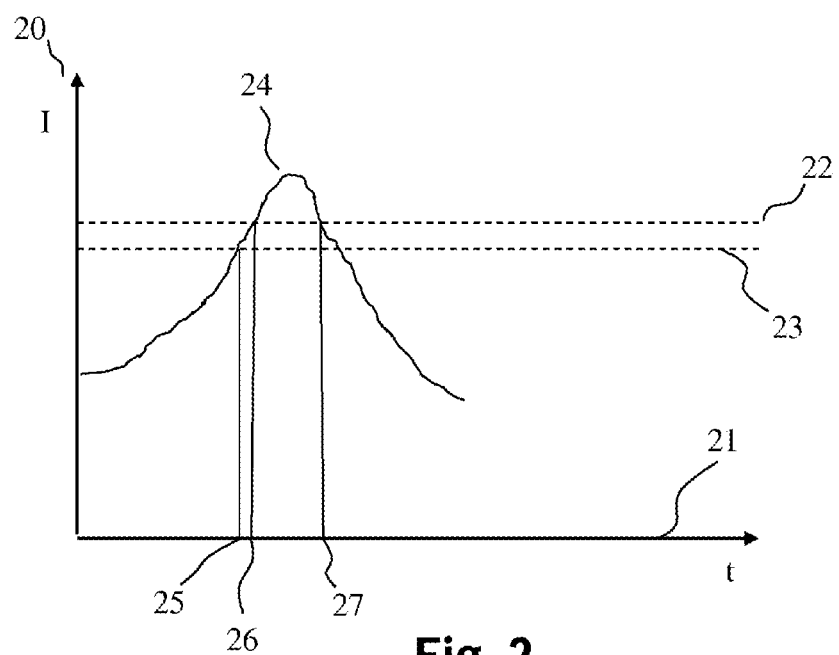
FIG. 2 shows a schematic illustration of a profile of a current flowing through an electrical line that can be interrupted by the safety switch.

FIG. 2 shows a schematic profile of a current (24) flowing through an electrical line of the electrical energy store (12). A current axis is denoted by the reference sign 20 and a time axis by the reference sign 21. The schematic current profile (24) from FIG. 2 exceeds a pre-threshold value (23) at a first time (25) and a predefinable threshold value (22) at a second time (26). The current profile (24) falls below the predefinable threshold value (22) at a third time (27). The third time (27) and the second time (26) therefore define an exceedance time during which the current profile (24) is above the threshold value (22).

Figure 3:
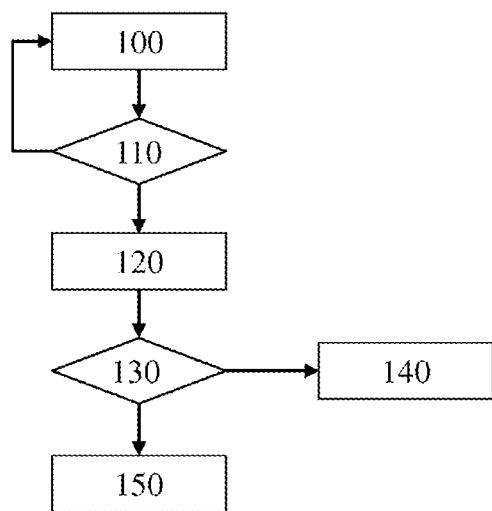
FIG. 3 shows a schematic illustration of the sequence of an exemplary embodiment of the method according to the invention.

FIG. 3 shows a schematic sequence of an exemplary embodiment of the method according to the invention. In step 100, the current flowing through the electrical line of the electrical energy store (12) is monitored. Step 110 subsequently follows.

In step 110, the current detected in step 100 is compared with the pre-threshold value (23). If the current is smaller than the pre-threshold value (23), step 100 subsequently follows step 110. If the current is greater than the pre-threshold value (23), step 120 subsequently follows step 110.

In step 120, the exceedance time is estimated. For this purpose, for example, an exceedance time that arose in the past can be used as estimated value. As an alternative or in addition, the exceedance time can be effected with the aid of a trained neural network. As an alternative or in addition, the exceedance time can be estimated by taking into account diverse operating parameters of the electric vehicle (10) that are provided by the vehicle control unit (18). Step 130 subsequently follows step 120.

In step 130, a check is carried out to determine whether the exceedance time estimated in step 120 is greater than a tolerance time. The tolerance time can in this case be measured, in particular, in such a way that safety of the electrical energy store (12) during the tolerance time is ensured, even when it is not possible to activate the safety switch (16) during the tolerance time. If the exceedance time is greater than the tolerance time, step 140 subsequently follows step 130. If the exceedance time is smaller than the tolerance time, step 150 subsequently follows step 130.

In step 140, the safety switch (16) is activated. The safety switch can be activated, for example, by the control unit (15) of the electrical energy store (12) or else by the vehicle control unit (18).

In step 150, a suppression signal is set, wherein the suppression signal is only removed again when the current detected in step 100 falls below the threshold value (22). As long as the suppression signal is set, an activation signal that is intended to bring about activation of the safety switch (16) is suppressed. The activation signal can in this case be suppressed, for example, by the control unit (15) of the electrical energy store (12).

The presented exemplary embodiment of the method according to the invention ensures that the electric vehicle (10) can be operated safely, even if the safety switch (16) is dimensioned in such a way that it is not possible to activate the safety switch (16) at high currents flowing through the electrical conductor of the electrical energy store (12) without the electrical energy store subsequently having to be graded as faulty and therefore being suppressed.

The invention claimed is:

1. A method for operating an electrical energy store (12), which comprises a storage cell (14) for storing electrical energy and a control unit (15), the method comprising:
   detecting a current (24) flowing through an electrical line of the electrical energy store (12);
   estimating an exceedance time once the current (24) exceeds a pre-threshold value (23);
   interrupting, via a safety switch (16), the electrical line of the electrical energy store (12) when the current (24) flowing through the electrical line is below a predefined threshold value (22), wherein the pre-threshold value (23) is smaller than the predefined threshold value (22); and
   activating the safety switch (16) when the estimated exceedance time, in which the current (24) is above the predefined threshold value (22), exceeds a predefined tolerance time, wherein the exceedance time is not longer than the tolerance time.

2. The method as claimed in claim 1, wherein the threshold value (22) corresponds to a maximum current of the safety switch (16).

3. The method as claimed in claim 1, wherein an activation signal that is intended to bring about the activation of the safety switch (16) is suppressed until the current (24) falls below the predefined threshold value (22).

4. The method as claimed in claim 1, wherein the exceedance time is estimated once the current (24) exceeds the predefined threshold value (22) and the safety switch (16) is activated when the estimated exceedance time exceeds the tolerance time.

5. A device, configured to carry out each step of the method as claimed in claim 1.

6. An electrical energy store, which comprises the device as claimed in claim 5.

7. A non-transitory, computer-readable medium containing instructions that when executed by a computer cause the computer to control an electrical energy store (12) having a storage cell (14) by:
   determining a current (24) flowing through an electrical line of the electrical energy store (12);
   estimating an exceedance time when the current (24) exceeds a pre-threshold value (23);
   interrupting, via a safety switch (16), the electrical line of the electrical energy store (12) when the current (24) flowing through the electrical line is below a predefined threshold value (22) program is run on a computation unit, wherein the pre-threshold value (23) is smaller than the predefined threshold value (22); and
   activating the safety switch (16) when the estimated exceedance time, in which the current (24) is above the predefined threshold value (22), exceeds a predefined tolerance time, wherein the exceedance time is not longer than the tolerance time.

* * * * *